United States Patent [19]
Dobkin

[11] 4,071,813
[45] Jan. 31, 1978

[54] TEMPERATURE SENSOR
[75] Inventor: Robert C. Dobkin, Atherton, Calif.
[73] Assignee: National Semiconductor Corporation, Santa Clara, Calif.
[21] Appl. No.: 508,462
[22] Filed: Sept. 23, 1974
[51] Int. Cl.² ............................................. G01K 7/00
[52] U.S. Cl. .................................. 323/8; 73/362 SC; 307/310; 323/19
[58] Field of Search .................... 73/362 SC; 307/310; 323/1, 4, 8, 16, 19, 68, 69

[56] References Cited
U.S. PATENT DOCUMENTS

| 3,377,545 | 4/1968 | Tveit | 323/19 |
| 3,421,375 | 1/1969 | Dimon | 73/362 SC |
| 3,851,241 | 11/1974 | Wheatley | 323/19 X |

Primary Examiner—A. D. Pellinen
Attorney, Agent, or Firm—Gail W. Woodward; Willis E. Higgins

[57] ABSTRACT

A temperature sensor includes a pair of transistors each connected in series with a respective one of a pair of resistors across a source of voltage. The emitters of the transistors are connected together and the collectors are connected to a respective input of a differential amplifier. An output of the amplifier drives a voltage divider circuit having a pair of outputs each connected to the base of a respective one of the transistors. The transistors are operated at different current densities and the ratio of such current densities is maintained constant with changes in temperature by feedback from the amplifier which has an output which is proportional to absolute temperature. In a second embodiment the supply voltage is generated by a current source, such that it will vary with changes in the load thereon. An output of the amplifier is connected to the base of a transistor which is connected across the voltage supply lines and the voltage divider, such that the voltage across the divider varies in accordance with the output of the amplifier. In a third embodiment the two sensing transistors each have a second emitter. The emitter areas of one of the transistors are unequal, such that a potentiometer connected from the first emitters of the transistors to the second emitters of the transistors permits calibration of the ratio of the current density of one transistor to the current density of the other transistor.

8 Claims, 4 Drawing Figures

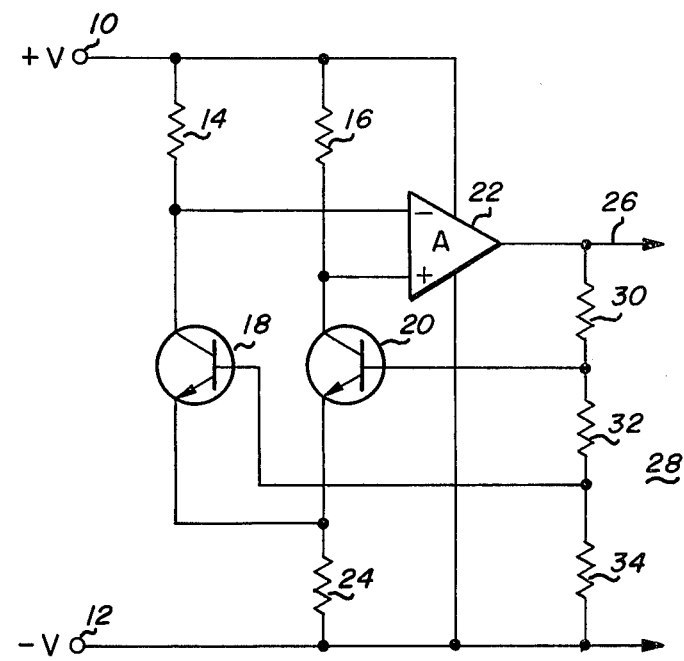
Fig_1
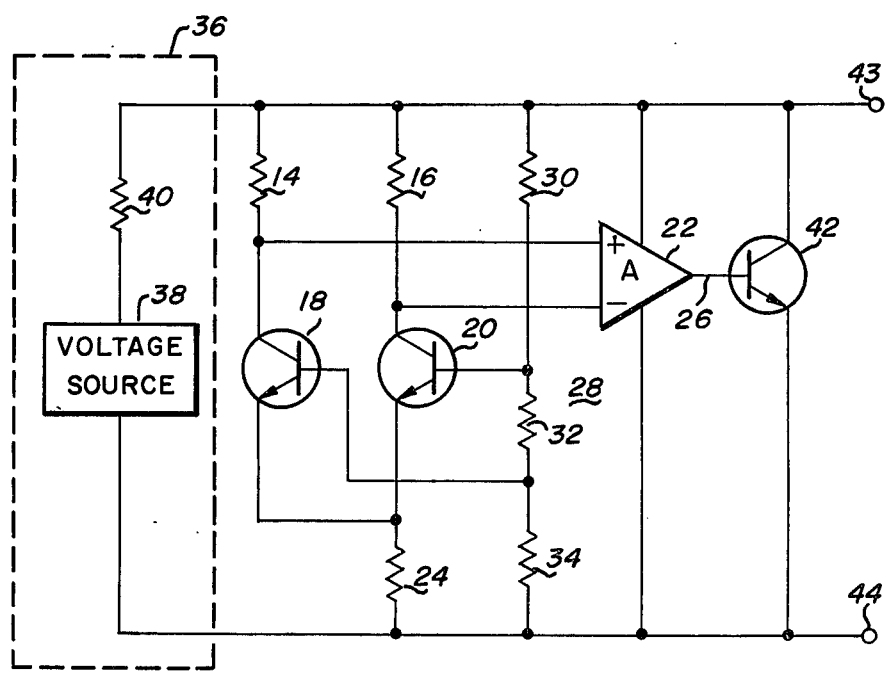
Fig_2

TEMPERATURE SENSOR

BACKGROUND OF THE INVENTION

1. Field of the Invention

This invention relates generally to a temperature sensor, and more particularly to a semiconductor temperature sensor which employs the difference in base-emitter voltages of matched transistors to provide an output which is directly proportional to absolute temperature.

2. Prior Art

In a copending application for U.S. Patent of Robert C. Dobkin, entitled TEMPERATURE TRANSDUCER, Ser. No. 477,323, filed June 7, 1974, now U.S. Pat. No. 4,004,462, and assigned to the same assignee as the present invention a temperature sensor is disclosed which employs the difference between the base-emitter voltages of at least two transistors to provide an output which is directly proportional to temperature in a known temperature scale. That application is referred to for a discussion of the problems associated with presently known temperature sensors, and transducers employing such sensors.

One of those problems relates to the need for a transducer which does not require wiring to remote locations for being supplied with regulated voltage or for amplifying, scaling, and performing other operations on its output before such an output can be utilized for measurement or control. As also discussed in that application, a need exists for a temperature sensor and transducer in which power dissipation is relatively low. The majority of the presently available temperature sensors can not be easily implemented in measurement and control systems. In addition, thermocouples have relatively low output signals which are difficult to amplify with any degree of stability. In addition, thermocouples require cold junction compensation. Resistance and thermistor sensors are nonlinear and excitation dependent. Another disadvantage of such sensors, however, is that their outputs are not directly related to any known temperature scale.

The temperature sensor discussed in the above-mentioned copending application employs the difference between the base-emitter voltages of transistors to generate an output which is proportional to temperature. Such an output can only be achieved if the ratio of the current density of one transistor to the current density of the other transistor is maintained constant with changes in temperature. A relatively large number of components, particularly matched transistors, are required to maintain the current density ratio constant with temperature changes. The sensor disclosed in that application is also not easily calibrated. Furthermore, that sensor circuit requires relatively high current gain to obtain the desired results.

In addition to the above mentioned disadvantages of prior known temperature sensors, a need exists for a two-terminal, self-contained temperature sensor in which only two wires are required to provide power to the sensor and to provide an indication to a remote location of the sensed temperature. Additionally, a need exists for a temperature which is easily adjusted or calibrated to provide an output which is linear and directly related to a known temperature scale.

SUMMARY OF THE INVENTION

It is, therefore, an object of the present invention to provide a temperature sensor which provides an output which is directly proportional to temperature and directly related to a known temperature scale.

Another object of the present invention is to provide a temperature sensor which employes relatively few components for generating an output which is directly proportional to temperature.

A further object of the present invention is to provide a temperature sensor which has relatively low proper requirements.

Still another object of the present invention is to provide a temperature sensor which can be easily adjusted or calibrated to produce an output which is linear and directly related to a known temperature scale.

A further object of the present invention is to provide a two-terminal, self-contained temperature sensor.

These and other objects of the present invention are attained by a temperature sensor which employs a pair of transistors connected in series with a current source, a differential amplifier for amplifying the difference between the voltages across such transistors, and a voltage divider circuit connected to an output of the amplifier and having one output connected to the base of one of the transistors and another output connected to the base of the other transistor. Because of the feedback loop which is formed by the voltage divider circuit connected between an output of the differential amplifier and the transistors, the amplifier output will change in a direction which will result in a zero differential between its inputs. When such a zero differential occurs, the output of the differential amplifier will stabilize and such output will be proportional to temperature in a known temperature scale. By appropriate scaling a direct readout can be obtained. When the inputs to the differential amplifier are equal, the current densities of the two transistors will remain constant with changes in temperature.

A feature of the present invention resides in the provision of a current source to provide a supply voltage to the transistors, and an output circuit which is responsive to the output of the differential amplifier to vary that supply voltage, thereby producing an output on the supply voltage lines which varies in direct proportion to temperature.

These and other objects, features and advantages of the present invention will be more fully realized and understood from the following detailed description, when taken in conjunction with the accompanying drawings wherein:

BRIEF DESCRIPTION OF THE DRAWINGS

FIG. 1 is a schematic diagram of a temperature sensor constructed in accordance with the principles of the present invention.

FIG. 2 is a schematic diagram of a two-terminal temperature sensor constructed in accordance with the principles of the present invention.

DETAILED DESCRIPTION OF THE PREFERRED EMBODIMENTS

Figure 3:
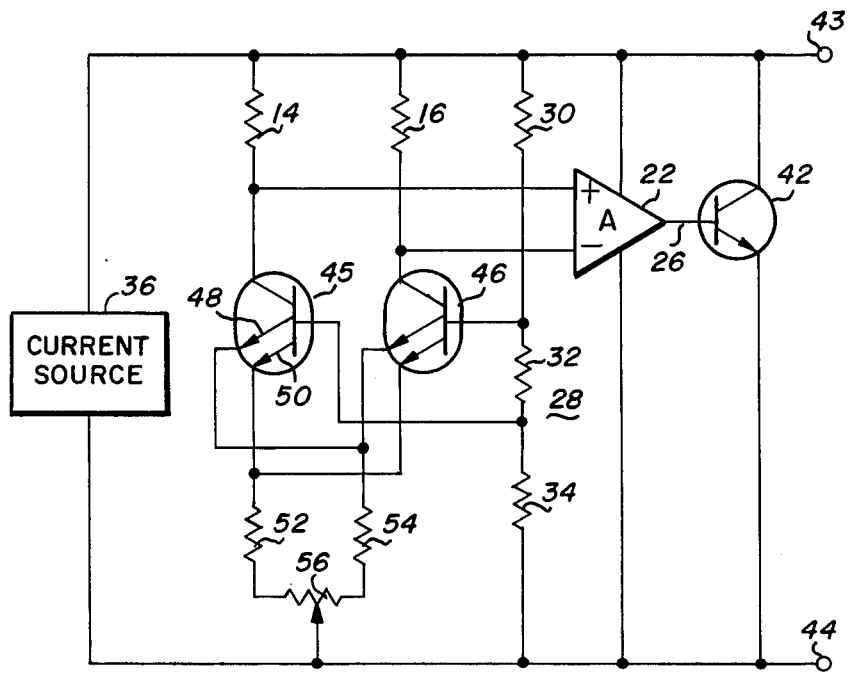
FIG. 3 is a schematic diagram of a second embodiment of a two-terminal temperature sensor of the present invention.

With reference to FIG. 1, a pair of terminals 10 and 12 are connected to a source of voltage (not shown). A pair of resistors 14 and 16 are connected from the terminal 10 to the collector of a respective one of transistors 18 and 20. The collectors of the transistors 18 and 20 are connected to a respective input of a differential amplifier 22, such that the difference between the voltages across the transistors 18 and 20 is impressed on the inputs of the amplifier 22. This voltage difference is also equal to the difference between the voltages across the resistors 14 and 16. The emitters of the transistors 18 and 20 are connected through a resistor 24, which acts as a current source, to the terminal 12.

An output of the amplifier 22 is supplied on a line 26 and supplies a voltage divider circuit 28 which is formed of resistors 30, 32 and 34. One side of the resistor 32 is connected to the base of the transistor 18 and the other side thereof is connected to the base of the transistor 20, such that the difference between the base-emitter voltages of the transistors 18 and 20 is developed on the resistor 32. Accordingly, this difference voltage is related to the voltage at the output of the amplifier 22 as the value of the resistor 32 is related to the value of the total resistance of the voltage divider 28.

The voltage divider 28 and transistors 18 and 20 form a feedback loop for the differential amplifier 22, such that it operates as an operational amplifier. Accordingly, if a zero voltage differential exists between the inputs to the amplifier 22, its output will remain fixed. However, if other than a zero voltage differential exists between the inputs of the amplifier 22, its output will change in a direction and to a value which will cause that input differential to change until it achieves a zero value (assuming the amplifier 22 is ideal).

Under quiescent conditions, the transistors 18 and 20 are operated at different current densities either by causing their collector currents to be different when their emitter areas are equal, or making their emitter areas different if their collector currents are to be equal, or by a combination of these two techniques. The difference between the base-emitter voltages of the transistors 18 and 20 is related to temperature in accordance with the following expression:

$$V_{be} = \frac{kT}{q} \ln \frac{J_1}{J_2},$$

where $V_{be}$ is the difference between the base-emitter voltages of the transistors 18 and 20, $k$ is Boltzmann's constant, T is absolute temperature in degrees Kelvin, $q$ is the charge on an electron, and $J_1$ and $J_2$ are the current densities of the transistors 18 and 20, respectively. When the transistors 18 and 20 are operated at different current densities, the temperature coefficients of their emitter-base voltages are different. Accordingly, if the difference between the base-emitter voltages of the transistors 18 and 20 is held constant with changes in temperature, their collector currents will change, with one collector current changing more than the other.

Assuming that the emitter areas of the transistors 18 and 20 are different and that the resistors 14 and 16 are equal in value, when the output of the amplifier 22 is equal to the voltage on the terminal 12, the base-emitter voltages of the transistors 18 and 20 will be zero and the collector current of the transistor having the smaller emitter area will initially increase to a value greater than the collector current of the other transistor. This condition causes a difference in the voltage drop across the resistors 14 and 16 which produces a voltage differential at the inputs of the amplifier 22.

Accordingly, the output of the amplifier 22 will change in a direction and to a value to produce a voltage drop across the resistor 32, thereby biasing the transistors 18 and 20 with a different base-emitter voltage. This change will continue until a zero differential appears across the inputs of the amplifier 22. When such a zero differential exists, the collector currents of the transistors 18 and 20 are equal and the difference between their base-emitter voltages which is developed across the resistor 32 will be directly proportional to temperature as expressed in the above equation. Since the operational amplifier will cause the collector currents of the transistors 18 and 20 to remain equal to one another under quiescent conditions, the ratio of their current densities will remain constant with changes in temperature. Accordingly, the voltage drop across the resistor 32 under quiescent conditions will be directly proportional to temperature with changes in temperature. The ratio of the resistance of resistor 32 to the total resistance of the divider circuit 28 is scaled, such that when the proper base-emitter voltage difference appears across the resistor 32, the output of the amplifier 22 will correspond to temperature in a known temperature scale.

If the emitter areas of the transistors 18 and 20 are equal, but the resistors 14 and 16 are of unequal value, under quiescent conditions the collector currents of the transistors 18 and 20 will be unequal. However, when the output of the amplifier 22 is equal to the voltage on the terminal 12, the base-emitter voltages of the transistors 18 and 20 will be zero causing their collector currents to be equal. The voltage drops across the resistors 14 and 16 will, therefore, be unequal. This difference in the voltages across the resistors 14 and 16 causes the amplifier 22 output to change in a direction and to a value which will result in the collector currents of the transistors 18 and 20 changing until the voltage drops across the resistors 14 and 16 are equal to one another. When the circuit achieves this state, the output of the amplifier 22 will be directly related to temperature in a known temperature scale.

Considering the general condition when the circuit has been operating at a particular temperature and has stabilized, a change in temperature will cause a change in the collector currents of the transistors 18 and 20 because of their temperature coefficients. If the transistors 18 and 20 are operating with different current densities under any of the above mentioned techniques, one collector current will change more than the other with such a temperature change. Since the emitter areas of the transistors are fixed, the ratio of their current densities will remain constant if the ratio of their collector currents remains constant. The ratio of the collector currents remains constant, since the voltage drops across the resistors 14 and 16 are made equal to one another by the action of the operational amplifier which drives the transistors until a zero differential exists at the inputs of the differential amplifier 22. Accordingly, the operational amplifier changes the difference between the base-emitter voltages of the transistors 18 and 20 until the voltage drops across the resistors 14 and 16 are equal to one another, thereby maintaining the ratio of their collector currents equal and the ratio of their current densities equal. Therefore, this base-emitter voltage difference is directly proportional to temperature in accordance with the above equation.

It will be noted that a change in the output of the amplifier 22 will cause a greater change in the base-emitter voltage of the transistor 20 than that produced in the base-emitter voltage of the transistor 18. Accordingly, if a temperature change occurs which causes the collector current of the transistor 20 to increase more than the collector current of the transistor 18, the output of the amplifier will decrease to cause a greater decrease in the base-emitter voltage of the transistor 18 than the decrease resulting in the base-emitter voltage of the transistor 20.

With reference to FIG. 2, the temperature sensor is provided with a supply voltage from a current source 36 which includes a voltage source 38 and a resistor 40. The output of the amplifier 22 is connected to the base of a transistor 42 which is connected across the supply voltage on terminals 43 and 44. Also, the voltage divider 28 is connected across the supply voltage. When the load on the current source changes, the voltage supply also changes. Accordingly, rather than supplying the amplifier 22 output directly to the voltage divider 28, as in the circuit of FIG. 1, it is supplied to the transistor 42 to change the voltage supplied to the divider 28 and, therefore, the voltage developed across the resistor 32.

As opposed to the operation of the circuit illustrated in FIG. 1, if the collector current of the transistor 20 increases more than the collector current of the transistor 18 with a change in temperature, the output of the amplifier 22 will increase, causing the current through the transistor 42 to increase and the voltage across the terminals 43 and 44 to decrease. Such a decrease in the voltage supply will decrease the voltage drop across the resistor 32. This decrease in the voltage across the resistor 32 will cause a greater decrease in the base-emitter voltage of the transistor 20 than the resultant decrease in the base-emitter voltage of the transistor 18. Accordingly, the collector current of the transistor 20 will be decreased more than the collector current of the transistor 18 by the action of the operational amplifier to maintain the ratio of the collector currents constant. During this transitional period, however, the output of the amplifier 22 has increased and the voltage supply on the terminals 43 and 44 has decreased to provide an indication of the change in temperature. The voltage divider is scaled, such that the voltage on the terminals 43 and 44, which is proportional to the voltage on the resistor 32, will be directly related to temperature in a known temperature scale. Accordingly, the circuit illustrated in FIG. 2 is a two-terminal, self-contained temperature sensor in which voltage is supplied to the same terminals on which the temperature indication is provided.

The circuit of FIG. 3 differs from that of FIG. 2 by the substitution of transistors 45 and 46 for the transistors 18 and 20, respectively, and the substitution of resistors 52 and 54 and potentiometer 56 for the resistor 24. The transistors 45 and 46 are each provided with two emitters. The emitters 48 and 50 of the transistor 45 are of unequal area and the emitters of the transistor 46 are of equal area. If the circuit of FIG. 3 is a monolithic circuit, the potentiometer 56 is external to the circuit. Temperature sensing and temperature indication is identical to that of the circuit illustrated in FIG. 2. However the circuit of FIG. 3 can be calibrated by adjusting the potentiometer 56. When the potentiometer is at its center position, equal collector currents will flow through the emitters 48 and 50. The current flow through the emitters of the transistor 46 will also be equal. However, when the potentiometer 46 is adjusted from its center position, unequal currents will flow through the emitters 48 and 50 and through the emitters of the transistor 46. Since the emitters of the transistor 46 have the same area, its current density will remain the same. Because of the unequal areas of the emitters 48 and 50, however, the current density of the transistor 45 will change with such adjustment of the potentiometer 56. Accordingly, the poentiometer 56 permits adjustment of the ratio of the current density of one transistor to the current density of the other transistor. It can be appreciated from the above equation that such adjustment provides calibration of the difference between the base-emitter voltages of the transistors 45 and 46 and, therefore, of the output on the terminals 43 and 44.

Figure 4:
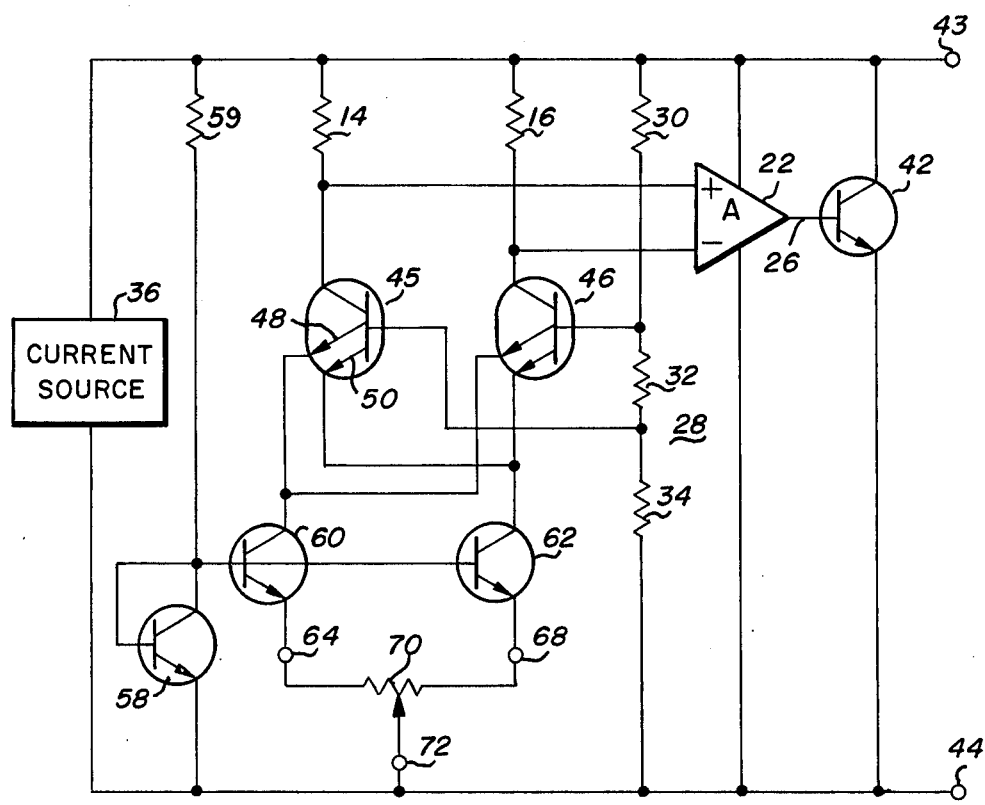
FIG. 4 is a schematic diagram of still another embodiment of a two-terminal sensor of the present invention.

The internal resistors 52 and 54 produce an undesirable temperature coefficient. The circuit illustrated in FIG. 4 employs transistor current sources, rather than the resistors 52 and 54, to eliminate this undesirable feature. More partiularly, a transistor 58, having its collector connected to its base, is connected in series with a resistor 59 across the voltage supply. Transistor 60 is connected between a first emitter of the transistors 45 and 46 and a terminal 64 and transistor 62 is connected between a second emitter of the transistors 45 and 46 and a terminal 68. A potentiometer 70 has its movable contact connected to a terminal 72 and is connected across the terminals 64 and 68, such that the currents through the transistors 60 and 62 can be adjusted with respect to one another. If the current density of the transistor 58 is different than the current densities of the transistors 60 and 62, the difference between their base-emitter voltages will appear across corresponding portions of the potentiometer 70. Accordingly, if the potentiometer is set at its center position, the current through the transistor 60 will be equal to the current through the transistor 62. Under such conditions, the current through the emitter 48 will be equal to the current through the emitter 50. However, movement of the potentiometer from its center position will cause an unbalance in these currents so that the current density of the transistor 45 can be adjusted. Since the voltage on the potentiometer 70 is proportional to temperature in accordance with the above equation, and since the currents which generate this voltage pass through the transistors 45 and 46, the current sources will not affect the relationship of their collector currents to temperature change.

In a constructed embodiment of the invention, the following values for the resistors were employed:

Resistors 14, 16 and 24 . . . 20K ohms
Resistors 30 and 34 . . . 25K ohms
Resistor 32 . . . 1K ohm Also, transistor 18 was provided with an area 10 times greater than the emitter area of transistor 20. The emitter area of emitter 48 was 11 times greater than the emitter areas of the transistor 46 and the emitter area of the emitter 50 was 9 times greater than the emitter areas of the transistor 46.

The invention claimed is:

1. A temperature sensor comprising a pair of transistors operating at different current densities, each of said transistors including a pair of collector-emitter circuits, the emitter area of one of said collector-emitter circuits of said first transistor being different than the emitter area of the other of said collector-emitter circuits of said first transistor, means for amplifying the difference between the voltage across a first of said transistors and the voltage across a second of said transistors, means responsive to an output of said amplifying means for supplying a voltage proportional to said output across the bases of said transistors, and a current source connected to a collector-emitter circuit of each of said transistors, and wherein said supplying means includes a third transistor and a voltage divider connected in parallel with one another and in parallel with the collector-emitter circuits of said transistors, the base of said third transistor being connected to an output of said amplifying means.

2. The temperature sensor of claim 1, wherein said amplifying means includes a differential amplifier having a pair of inputs each connected to one side of a collector-emitter circuit of a respective one of said transistors.

3. The temperature sensor of claim 2, wherein the other side of a first collector-emitter circuit of said first transistor is connected to the other side of a first collector-emitter circuit of said second transistor, and wherein the other side of a second collector-emitter circuit of said first transistor is connected to the other side of a second collector-emitter circuit of said second transistor, and further including a potentiometer connected between the other side of said first collector-emitter circuits and the other side of said second collector-emitter circuits.

4. The temperature sensor of claim 1, wherein said supplying means includes a voltage divider connected to an output of said amplifying means, with the base of said first transistor connected to one output thereof and the base of said second transistor connected to another output thereof.

5. The temperature sensor of claim 1, further comprising a pair of resistors, each connected in series with the collector-emitter circuit of a respective one of said transistors.

6. The temperature sensor of claim 5, wherein said resistors are of equal value and the emitter areas of said transistors are unequal.

7. The temperature sensor of claim 5, wherein the resistance values of said resistors are unequal and the emitter areas of said transistors are equal.

8. A two-terminal temperature sensor, comprising a pair of terminals, a current source connected between said pair of terminals, means connected between said terminals for sensing temperature and providing an output proportional to temperature, said means including a pair of transistors and a pair of resistors each connected in series with a respective one of said pair of transistors across said terminals, a differential amplifier having a pair of inputs each connected to the collector-emitter circuit of a respective one of said pair of transistors and providing said output proportional to temperature, a voltage divider connected across said terminals and having a pair of outputs each connected to the base of a respective one of said pair of transistors, and a current source connected to a collector-emitter a third transistor having its collector and emitter connected to a respective one of said terminals and its base connected to the output of said sensing means, such that the voltage between said terminals is directly proportional to temperature.

* * * * *